United States Patent
Tamura

(10) Patent No.: US 9,426,368 B2
(45) Date of Patent: Aug. 23, 2016

(54) COMMUNICATION SYSTEM AND CAMERA SYSTEM

(71) Applicant: Panasonic Intellectual Property Management Co., Ltd., Osaka (JP)

(72) Inventor: Akihiro Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/573,827

(22) Filed: Dec. 17, 2014

(65) Prior Publication Data
US 2015/0181092 A1   Jun. 25, 2015

(30) Foreign Application Priority Data
Dec. 24, 2013 (JP) .................................. 2013-264841

(51) Int. Cl.
*H04N 5/232* (2006.01)

(52) U.S. Cl.
CPC ....... *H04N 5/23245* (2013.01); *H04N 5/23209* (2013.01)

(58) Field of Classification Search
CPC .......... H04N 5/23245; H04N 5/23209; H04N 5/232; H04N 2101/00; G03B 17/14
USPC ......... 348/360, 207.99, 211.1; 396/FOR. 755
See application file for complete search history.

(56) References Cited

U.S. PATENT DOCUMENTS

| | | | | |
|---|---|---|---|---|
| 2002/0118972 A1* | 8/2002 | Uenaka | ................ | G02B 27/646 396/532 |
| 2011/0317990 A1* | 12/2011 | Imafuji | ............. | H04N 5/23209 396/133 |
| 2013/0011126 A1* | 1/2013 | Kamimura | ............... | G03B 9/08 396/52 |
| 2013/0011130 A1* | 1/2013 | Kamimura | ............... | G03B 9/62 396/452 |

FOREIGN PATENT DOCUMENTS

| | | | | |
|---|---|---|---|---|
| JP | 2010-237514 A | 10/2010 | | |
| JP | 2010237514 A | * 10/2010 | ............. | G03B 17/14 |

* cited by examiner

*Primary Examiner* — Nhan T Tran
(74) *Attorney, Agent, or Firm* — McDermott Will & Emery LLP

(57) ABSTRACT

The present disclosure provides a communication system which can shorten a data transfer time by realizing transmission and reception of data using two communicators. The present disclosure is a communication system which includes: a first device; and a second device, and in which the first device includes a first controller, the second device includes a second controller, the first controller and the second controller are connected through a first communicator and a second communicator, and the second controller switches and selectively executes one of a reception mode for receiving data from the first controller using the first communicator, and the second communicator and a transmission/reception mode for transmitting data to the first controller using the first communicator and receiving data from the first controller using the second communicator.

10 Claims, 5 Drawing Sheets

COMMUNICATION SYSTEM AND CAMERA SYSTEM

RELATED APPLICATIONS

This application claims the benefit of Japanese Application No. 2013-264841, filed on Dec. 24, 2013, the disclosure of which Application is incorporated by reference herein.

BACKGROUND

1. Technical Field

The present disclosure relates to a communication system of a first device and a second device. For example, the present disclosure relates to a camera system which transmits and receives data between an interchangeable lens and a camera body.

2. Description of the Related Art

PTL 1 discloses a camera system which has an image capturing lens and an imaging device, and which transfers data between the image capturing lens and the imaging device according to a communication method matching data to be transmitted.

CITATION LIST

Patent Literature

PTL 1: Unexamined Japanese Patent Publication No. 2010-237514

SUMMARY

The present disclosure provides a communication system whose data transfer time is shorter.

The present disclosure is a communication system which includes: a first device; and a second device, and in which the first device includes a first controller, the second device includes a second controller, the first controller and the second controller are connected through a first communicator and a second communicator, and the second controller switches and selectively executes one of a reception mode for receiving data from the first controller using the first communicator and the second communicator and a transmission/reception mode for transmitting data to the first controller using the first communicator and receiving data from the first controller using the second communicator.

Further, the present disclosure is a camera system which includes: an interchangeable lens; and a camera body, and in which the interchangeable lens includes a lens controller, the camera body includes a body controller, the lens controller and the body controller are connected through a first communicator and a second communicator, and the body controller switches and selectively executes one of a reception mode for receiving data from the lens controller using the first communicator and the second communicator and a transmission/reception mode for transmitting data to the lens controller using the first communicator and receiving data from the lens controller using the second communicator.

Furthermore, the present disclosure is a camera system which includes: an interchangeable lens; and a camera body, and includes: a first communicator which performs communication between the interchangeable lens and the camera body with a direction of the communication switchable; a second communicator which performs the communication between the interchangeable lens and the camera body in a predetermined communication direction; and a controller which controls the first communicator and the second communicator, and the controller includes a first communication state of matching the communication direction of the first communicator and the communication direction of the second communicator, and performing unidirectional communication between the interchangeable lens and the camera body using both of the first and the second communicators, and a second communication state of differing the communication direction of the first communicator and the communication direction of the second communicator, and performing bidirectional communication between the interchangeable lens and the camera body using both of the first and the second communicators.

The communication system according to the present disclosure can make a data transfer time shorter by achieving transmission and reception of data using two communicators.

DETAILED DESCRIPTION OF THE PREFERRED EMBODIMENTS

Exemplary embodiments will be described in detail below optionally with reference to the drawings. However, the exemplary embodiments will not be described in detail more than necessary in some cases. For example, in some cases, matters which have already been well known will not be described in detail, and substantially same components will not be described again. This is to prevent the following description from being redundant more than necessary, and make one of ordinary skill in the art easily understand the following description.

In addition, the inventor provides the accompanying drawings and the following description to make it easy for one of ordinary skill in the art to sufficiently understand the present disclosure, and does not intend to limit the subject matters recited in the claims.

First Exemplary Embodiment

The first exemplary embodiment will be described with reference to FIGS. 1 to 4.

1. Configuration

Figure 1:
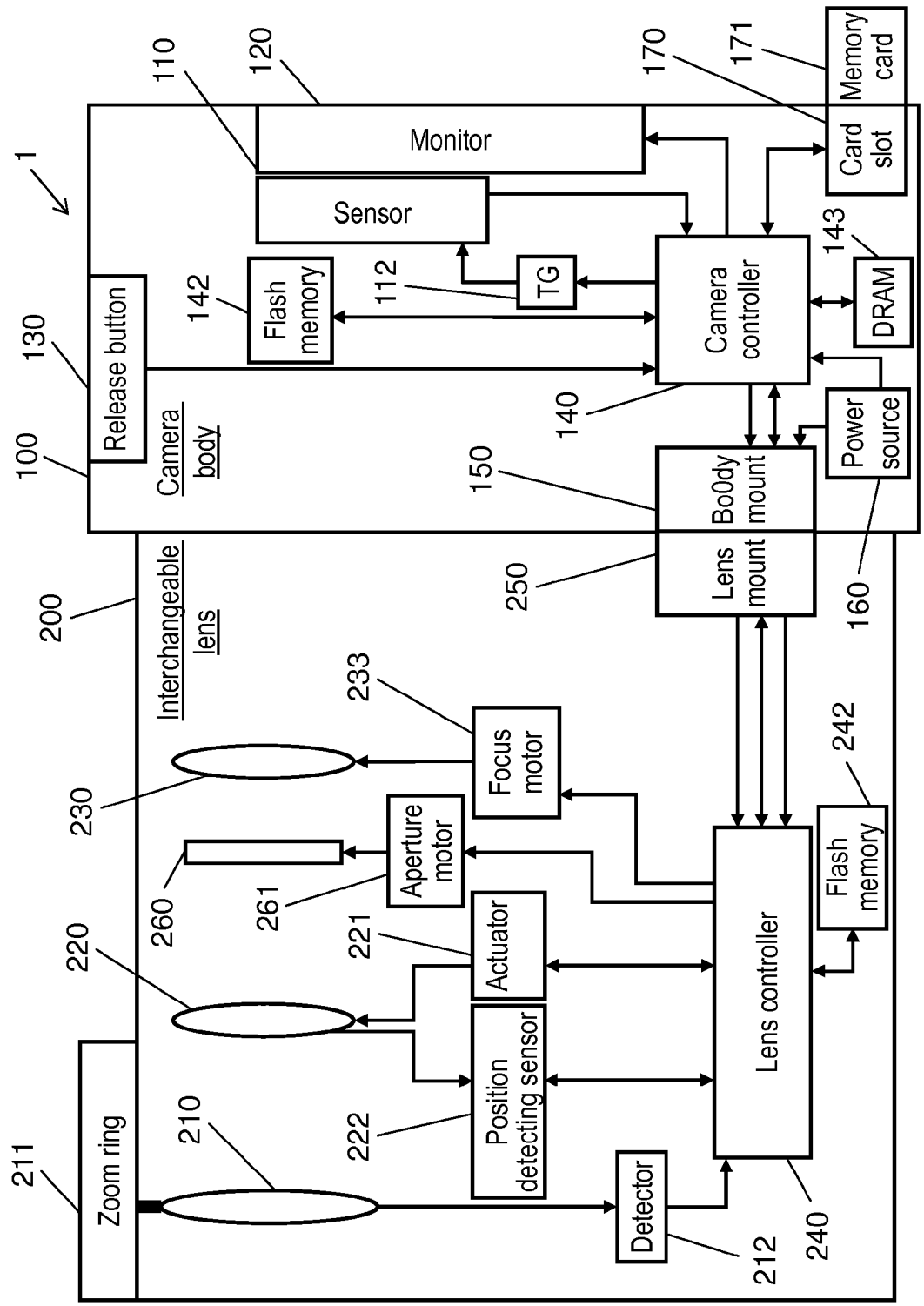
FIG. 1 is a configuration diagram of a camera system according to a first exemplary embodiment.

FIG. 1 illustrates a configuration of camera system 1 according to the present exemplary embodiment. Camera system 1 has camera body 100 and interchangeable lens 200. Camera system 1 can adequately control a camera by performing communication between camera body 100 and interchangeable lens 200. Interchangeable lens 200 is an example of a first device. Camera body 100 is an example of a second device. Lens controller 240 is an example of a lens controller and a first controller. Camera controller 140 is an example of a camera controller and a second controller.

[1-1. Configuration of Camera Body]

Camera body 100 has sensor 110, monitor 120, release button 130, camera controller 140, body mount 150, power source 160 and card slot 170.

Camera controller 140 controls an entire operation of camera system 1. Camera controller 140 supplies a synchronization signal to timing generator (TG) 112. DRAM 143 is used as a working memory upon a control operation or an image processing operation of camera controller 140. Flash memory 142 stores programs and parameters used to control camera controller 140.

Sensor 110 generates an image signal from an optical signal including a subject image which is incident through interchangeable lens 200. The generated image signal is subjected to various types of image processing by camera controller 140.

Sensor 110 operates at a timing of a control signal output from timing generator 112. An operation of sensor 110 includes a still image imaging operation, a moving image imaging operation and a through image imaging operation. A through image is an image which is captured by sensor 110 and then is displayed on monitor 120 in real time. A through image is mainly a moving image, and is displayed on monitor 120 for a user to determine a composition of a still image upon imaging.

Monitor 120 displays an image indicated by display image data which has been subjected to image processing by camera controller 140. Monitor 120 can selectively display a moving image, a still image and a message indicating a state of camera system 1.

Power source 160 supplies power which is consumed by camera system 1. Power source 160 may be, for example, a dry-cell battery or a rechargeable battery. Further, power source 160 may supply power supplied from outside through a power cord, to camera system 1.

Card slot 170 is a slot to which memory card 171 is attached. Camera controller 140 can record a captured still image or moving image in memory card 171.

Body mount 150 can mechanically or electrically connect with lens mount 250 of interchangeable lens 200. Body mount 150 can transmit and receive commands and data to and from interchangeable lens 200 through lens mount 250. Body mount 150 transmits various control signals received from camera controller 140, to lens controller 240 through lens mount 250. Further, body mount 150 supplies power supplied from power source 160, to entire interchangeable lens 200 through lens mount 250.

[1-2. Configuration of Interchangeable Lens]

Interchangeable lens 200 has an optical system, lens controller 240 and lens mount 250. The optical system includes zoom lens 210, OIS (Optical Image Stabilizer) lens 220, aperture 260 and focus lens 230.

Zoom lens 210 is a lens which changes a magnification of a subject image formed by the optical system of interchangeable lens 200. Zoom ring 211 which can be operated by a user moves zoom lens 210 along an optical axis direction of the optical system in response to the user's rotation operation. Detector 212 detects a drive amount of zoom ring 211. Lens controller 240 can grasp a zoom position and a zoom magnification of the optical system by obtaining a detection result of this detector 212.

OIS lens 220 is a lens which corrects a blur of a subject image formed by the optical system of interchangeable lens 200. OIS lens 220 reduces the blur of the subject image in sensor 110 by moving in a direction to cancel the blur of camera system 1. Actuator 221 drives OIS lens 220 in a plane vertical to an optical axis of the optical system under control of lens controller 240. Actuator 221 is realized by, for example, a magnet and a flat coil. Position detecting sensor 222 is a sensor which detects a position of OIS lens 220 in the plane vertical to the optical axis of the optical system. Position detecting sensor 222 can be realized by, for example, a magnet and a hall element.

Aperture 260 is a member which adjusts the amount of light which passes through the optical system. Aperture 260 is formed with, for example, a plurality of aperture blades, and can adjust the amount of light by opening and closing an opening portion formed by the blades. Aperture motor 261 is drive means which opens and closes the opening portion of aperture 260.

Focus lens 230 is a lens which changes a focus state of a subject image formed on sensor 110 by the optical system.

Focus motor 233 drives focus lens 230 under control of lens controller 240, and causes focus lens 230 to move forward and backward along the optical axis of the optical system. Consequently, it is possible to change a focus state of the subject image formed on sensor 110 by the optical system.

Lens controller 240 controls an entire operation of interchangeable lens 200 based on a control data from camera controller 140. Further, lens controller 240 receives position data from detector 212 and position detecting sensor 222, and transmits the position data to camera controller 140. Lens controller 240 transmits and receives the data to and from camera controller 140 through lens mount 250 and body mount 150.

Flash memory 242 stores programs and parameters used by lens controller 240 for performing control.

Lens mount 250 can mechanically or electrically connect with body mount 150 of camera body 100. Lens mount 250 can transmit and receive commands and data to and from camera body 100 through body mount 150. Lens mount 250 transmits various control signals received from lens controller 240, to camera controller 140 through body mount 150.

[1-3. Configuration of Communication Interface]

A communication interface between the camera body and the interchangeable lens includes body mount 150 and lens mount 250. Communication is performed between camera controller 140 and lens controller 240 through body mount 150 and lens mount 250. In this regard, for ease of description, in terms of communication, a camera controller 140 side will be referred to as a B side and a lens controller 240 side will be referred to as an L side below. Further, a communication direction from the camera controller 140 side to the lens controller 240 side will be referred to as a BL direction, and a direction opposite to the BL direction will be referred to as an LB direction in some cases.

Figure 2:
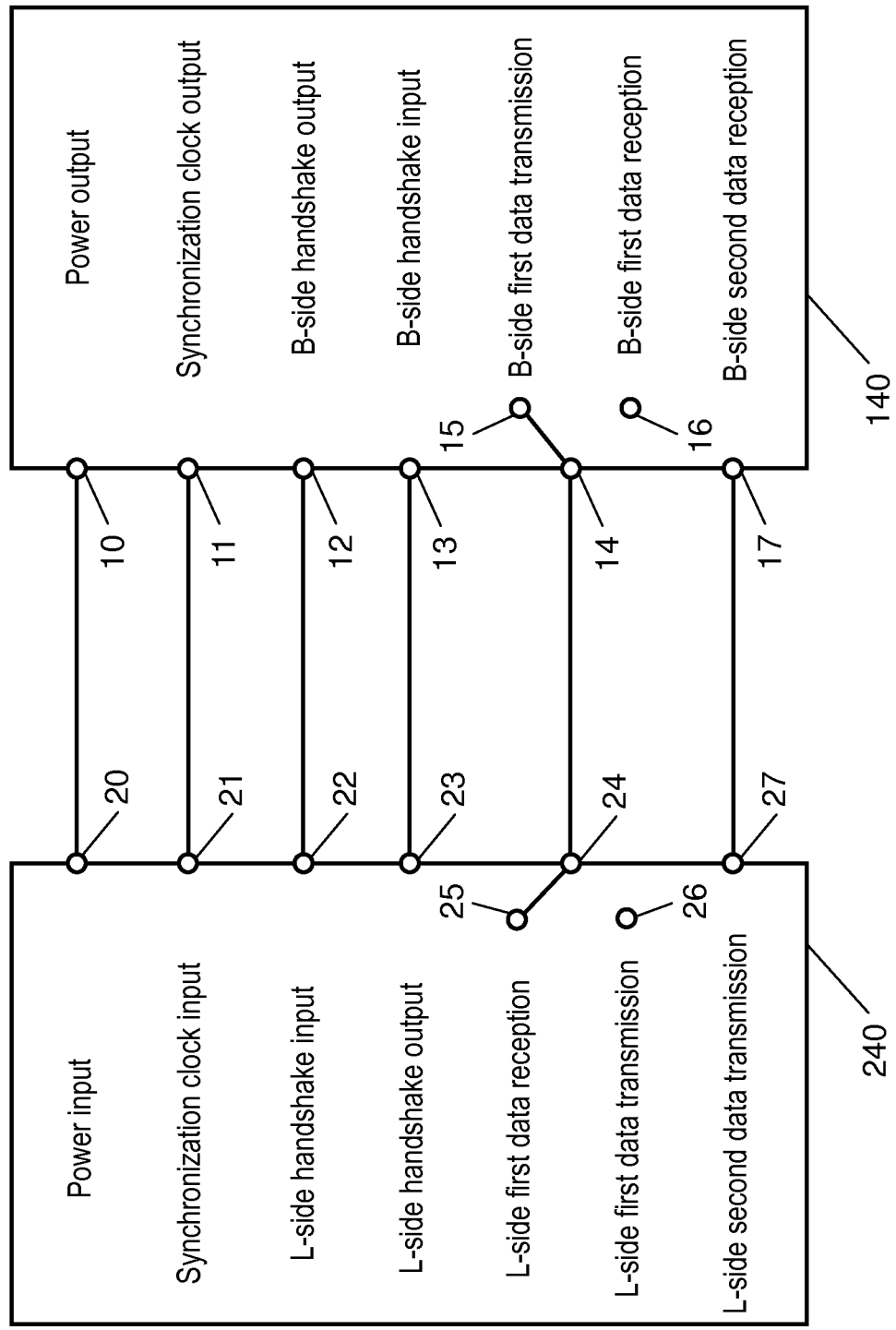
FIG. 2 is a view schematically illustrating each circuit included in a camera controller and a lens controller according to the first exemplary embodiment.

FIG. 2 is a view schematically illustrating each circuit included in camera controller 140 and lens controller 240. Communication between each controller is performed through communication terminals (not illustrated) provided on body mount 150 and lens mount 250. In addition, each circuit described below is not necessarily a hardware circuit. Each circuit may be a software circuit on a program.

Each circuit included in camera controller 140 will be described. Power output circuit 10 is a circuit which supplies necessary power to interchangeable lens 200. Synchronization clock output circuit 11 is a circuit which outputs a synchronization clock signal for performing communication between the camera body and the interchangeable lens, from camera controller 140 to lens controller 240. B-side handshake output circuit 12 is a circuit which outputs a communication control signal from camera controller 140 to lens controller 240. B-side handshake input circuit 13 is a circuit which receives an input of a communication control signal from lens controller 240 to camera controller 140. B-side first data communication circuit 14 is a circuit which can switch a communication direction between the camera body and the interchangeable lens. B-side first data communication circuit 14 can connect to B-side first data transmission circuit 15 which transmits data or B-side first data reception circuit 16 which receives data. B-side second data reception circuit 17 is a circuit which receives data from lens controller 240 to camera controller 140.

Each circuit included in lens controller 240 will be described. Power input circuit 20 is a circuit to which necessary power for an operation of the interchangeable lens is supplied from power output circuit 10. Synchronization clock input circuit 21 is a circuit which receives an input of a synchronization clock signal which is output from synchronization clock output circuit 11 and is used for performing communication between the camera body and the interchangeable lens. L-side handshake input circuit 22 is a circuit which receives an input of a communication control signal from B-side handshake output circuit 12. L-side handshake output circuit 23 is a circuit which outputs a communication control signal from lens controller 240 to camera controller 140. L-side first data communication circuit 24 is a circuit which can switch a communication direction between the camera body and the interchangeable lens. L-side first data communication circuit 24 can connect to L-side first data reception circuit 25 which receives data or L-side first data transmission circuit 26 which transmits data. L-side second data transmission circuit 27 is a circuit which transmits data from lens controller 240 to camera controller 140.

In addition, B-side first data communication circuit 14 and L-side first data communication circuit 24 will be collectively referred to as a first data communication circuit. Further, B-side second data reception circuit 17 and L-side second data transmission circuit 27 will be collectively referred to as a second data communication circuit. The first data communication circuit is an example of a first communicator. The second data communication circuit is an example of a second communicator. Further, B-side handshake output circuit 12, B-side handshake input circuit 13, L-side handshake input circuit 22 and L-side handshake output circuit 23 configure a handshake communicator. Furthermore, synchronization clock output circuit 11 and synchronization clock input circuit 21 configure a synchronization clock communicator.

Signals between respective terminals for communication between the camera body and the interchangeable lens will be described. A synchronization clock signal is a signal which is used to adjust signal transmission/reception timings and establish a communication path. A handshake signal is a signal which is used to notify data communication start and end timings and a data communication direction to camera controller 140 and lens controller 240 after a communication path between camera controller 140 and lens controller 240 is established. A data signal is a signal which includes necessary information for an operation of camera system 1 such as information unique to a lens and information required to drive the lens.

Further, camera controller 140 and lens controller 240 switch each signal to a high level (H) or a low level (L) upon communication. Camera controller 140 switches between H and L of a synchronization clock signal at a fixed cycle upon transmission of the synchronization clock signal. Each controller switches between H and L of a handshake signal and a data signal when necessary upon transmission and reception of the handshake signal and the data signal. Each controller performs communication in synchronization with a synchronization clock signal upon communication of a data signal.

2. Operation

Camera system 1 according to the present exemplary embodiment includes a high speed mode and a normal mode for communication between camera controller 140 and lens controller 240. The high speed mode and the normal mode will be described in detail below.

[2-1. High Speed Mode (Upon Activation)]

Figure 3:
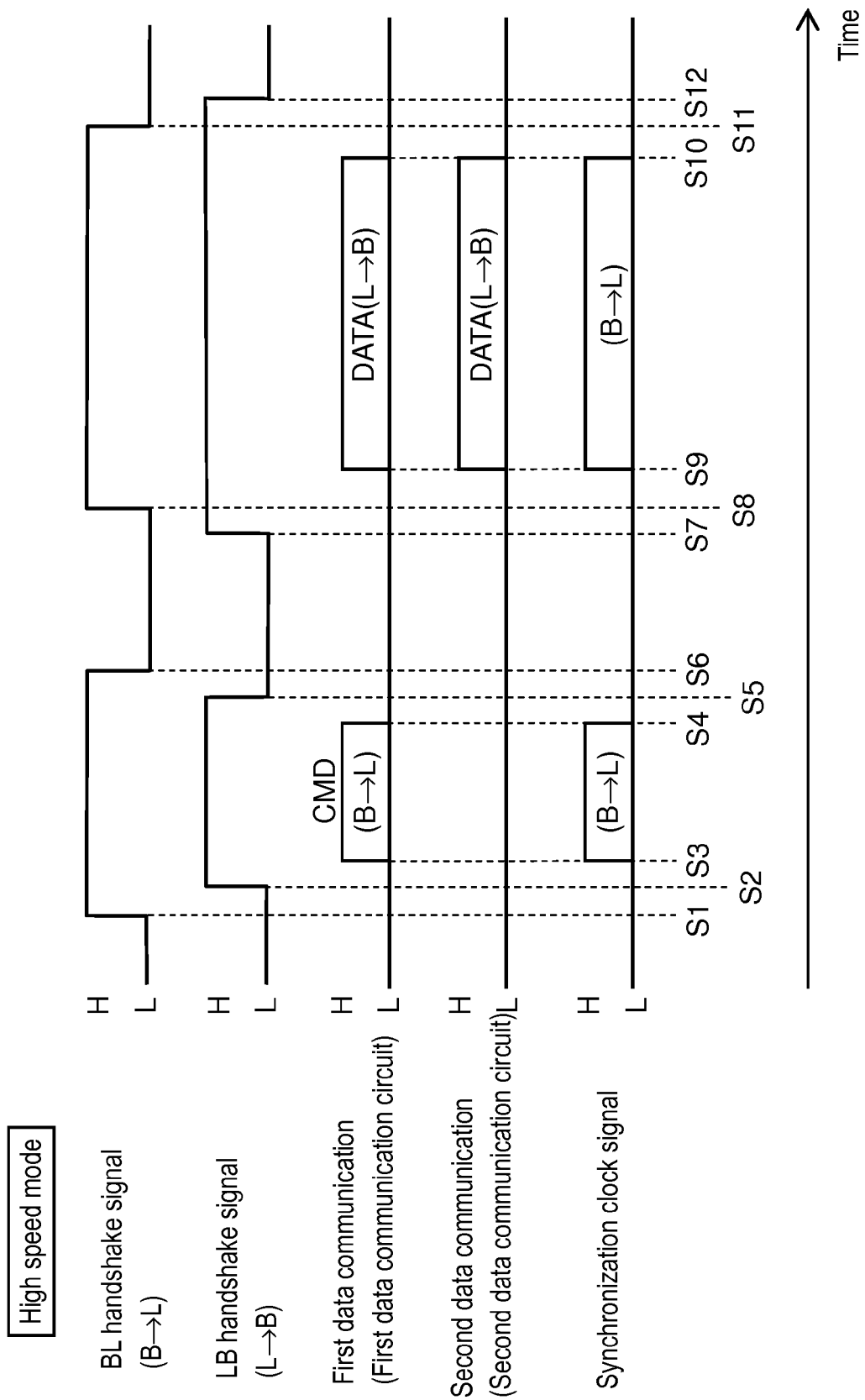
FIG. 3 is a signal diagram of a command/data signal to be used for communication between a camera body and an interchangeable lens in a high speed mode of the camera system according to the first exemplary embodiment.

FIG. 3 is a diagram illustrating a signal example of a command/data signal to be used for communication between the camera body and the interchangeable lens in the high speed mode of camera system 1 according to the present exemplary embodiment. In FIG. 3, timings at which H and L of each signal switch are S1 to S12.

Camera system 1 obtains lens data upon activation. Lens data is data including information of interchangeable lens 200, and is used to control interchangeable lens 200. Camera system 1 upon activation needs to obtain a large amount of lens data in a short time. Hence, camera system 1 performs unidirectional communication in the high speed mode, and obtains the lens data. An operation of camera system 1 according to the present exemplary embodiment in the high speed mode will be described below.

First, camera controller 140 notifies transmission of a command from camera controller 140 to lens controller 240 by switching a BL handshake signal to H (S1). When camera system 1 is in the high speed mode, a command (CMD) transmitted from camera controller 140 to lens controller 240 is a lens data obtaining command. In this case, camera controller 140 connects B-side first data communication circuit 14 to B-side first data transmission circuit 15.

When lens controller 240 detects that the BL handshake signal has switched to H (S1), lens controller 240 connects L-side first data communication circuit 24 to L-side first data reception circuit 25. That is, the communication direction of the first data communication circuit is a direction (BL direction) from camera controller 140 to lens controller 240. Then, lens controller 240 prepares for reception of a command.

When lens controller 240 finishes preparing for reception of the command, lens controller 240 switches a LB handshake signal to H (S2). Consequently, lens controller 240 notifies to camera controller 140 that preparing for reception of the command has been finished.

When camera controller 140 detects that the LB handshake signal has switched to H (S2), camera controller 140 outputs a command (CMD) as a first data communication signal (BL direction) in synchronization with the synchronization clock signal (S3).

When lens controller 240 finishes receiving the command (S4), lens controller 240 switches the LB handshake signal to L (S5).

When camera controller 140 detects that the LB handshake signal has switched to L (S5), camera controller 140 switches the BL handshake signal to L (S6). Consequently, camera controller 140 notifies to lens controller 240 that communication of the command has been finished.

When camera system 1 according to the present exemplary embodiment is in the high speed mode, the lens data obtaining command is transmitted from camera controller 140 to lens controller 240. When lens controller 240 analyzes the command and interprets the command as the lens data obtaining command, lens controller 240 finishes preparing for transmission of the lens data and then switches the LB handshake signal to H (S7). Further, lens controller 240 connects L-side first data communication circuit 24 to L-side first data transmission circuit 26. That is, the communication direction of the first data communication circuit is a direction (LB direction) from lens controller 240 to camera controller 140.

When camera controller 140 detects that the LB handshake signal has switched to H (S7), camera controller 140 prepares for reception of the lens data. In this case, camera controller 140 connects B-side first data communication circuit 14 to B-side first data transmission circuit 16. When camera controller 140 finishes preparing for reception, camera controller 140 switches the BL handshake signal to H (S8) and outputs a synchronization clock signal. Further, camera controller 140 starts receiving the lens data (S9). In this case, camera controller 140 receives the lens data using both of B-side first data communication circuit 14 and B-side second data reception circuit 17 in synchronization with the synchronization clock signal.

In other words, camera system 1 in the high speed mode communicates the lens data in one direction from the lens controller 240 to camera controller 140 using both of the first data communication circuit and the second data communication circuit. Consequently, camera system 1 can reduce a time required to transfer a large amount of lens data.

When camera controller 140 finishes receiving lens data (S10), camera controller 140 switches a BL handshake signal to L (S11) and notifies to lens controller 240 that the BL handshake signal has switched to L.

When lens controller 240 detects that the BL handshake signal has switched to L (S11), lens controller 240 switches the LB handshake signal to L (S12). Consequently, camera system 1 finishes communication processing for obtaining lens data.

[2-2. Normal Mode (Upon Image Capturing)]

Figure 4:
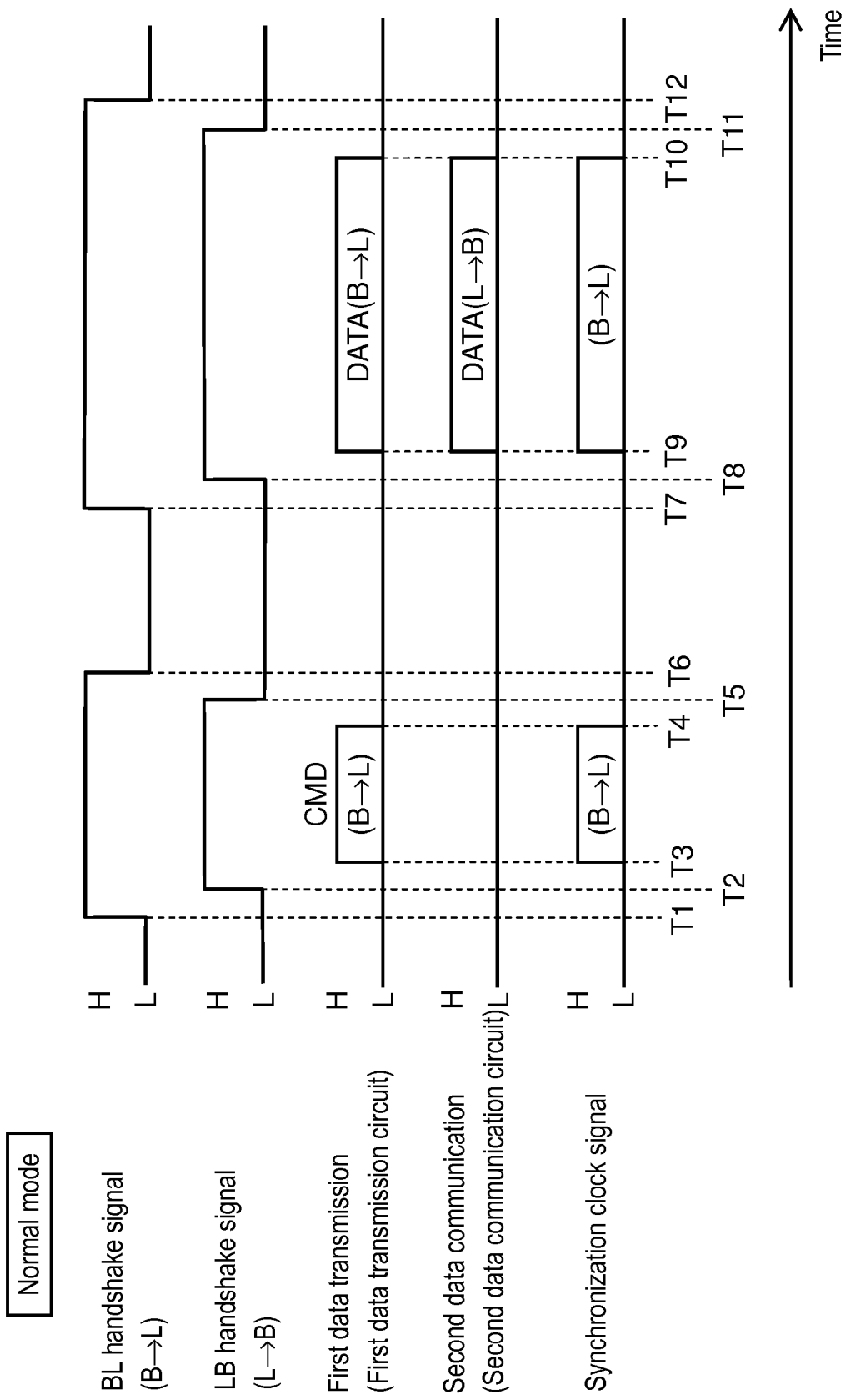
FIG. 4 is a signal diagram of a command/data signal to be used for communication between a camera body and an interchangeable lens in a normal mode of the camera system according to the first exemplary embodiment.

FIG. 4 is a diagram illustrating an example of a command/data signal to be used for communication between the camera body and the interchangeable lens in the normal mode of camera system 1 according to the present exemplary embodiment. In FIG. 4, timings at which H and L of each signal switch are T1 to T12.

Camera system 1 obtains status data of interchangeable lens 200 to drive actuator 221 of interchangeable lens 200 or the like after activation or upon image capturing after the lens is attached. Further, camera system 1 transmits drive parameters to interchangeable lens 200 to drive actuator 221 or the like. More specifically, lens controller 240 notifies lens status data to camera controller 140. Camera controller 140 transmits drive parameters (e.g. a drive mode and a target value) to lens controller 240 based on the lens status data, and controls the entire operation of interchangeable lens 200 (operations of focus lens 230, aperture 260 and OIS lens 220). Hence, camera system 1 after activation needs to perform bidirectional communication. An operation of camera system 1 according to the present exemplary embodiment in the normal mode upon image capturing will be described below.

Operations at T1 to T6 in FIG. 4 are the same operations at S1 to S6 in FIG. 3, and therefore will not be described.

Camera controller 140 prepares for transmission of a command and prepares for reception of lens status data. When camera controller 140 finishes preparing for transmission and reception, camera controller 140 switches a BL handshake signal to H (T7).

When camera system 1 according to the present exemplary embodiment is in the normal mode, a command (CMD) transmitted from camera controller 140 to lens controller 240 is a lens status obtaining/drive command. When lens controller 240 analyzes the command and interprets the command as the lens status obtaining/drive command, lens controller 240 waits for the BL handshake signal to switch to H (T7). Lens controller 240 checks that the BL handshake signal has switched to H, and then connects L-side first data communication circuit 24 to L-side first data reception circuit 25. That is, the communication direction of the first data communication circuit is a direction (BL direction) from camera controller 140 to lens controller 240. Further, lens controller 240 finishes preparing for transmission of the lens status data and reception of drive parameters, and then switches the LB handshake signal to H (T8).

When camera controller 140 detects that the LB handshake signal has switched to H (T8), camera controller 140 outputs a synchronization clock signal. Further, lens controller 240 transmits the lens status data and receives the drive parameters, and camera controller 140 receives the lens status data and transmits the drive parameters (T9). In this case, lens controller 240 transmits the lens status data using L-side second data transmission circuit 27, and receives the drive parameters using L-side first data communication circuit 24. Further, camera controller 140 transmits the drive parameters using B-side first data communication circuit 14, and receives the lens status data using B-side second data reception circuit 17.

That is, camera system 1 in the normal mode simultaneously transmits and receives the drive parameters and the lens status data using both of the first data communication circuit and the second data communication circuit. Consequently, camera system 1 can reduce a time required to control driving of the lens.

When lens controller 240 finishes receiving the drive parameters and transmitting the lens status data, lens controller 240 switches the LB handshake signal to L (T11). In the operation in T11, lens controller 240 notifies to camera controller 140 that communication processing of receiving the drive parameters and transmitting the lens status data has been finished.

When camera controller 140 detects that the LB handshake signal has switched to L (T11), camera controller 140 switches the BL handshake signal to L (T12). Consequently, camera system 1 finishes communication processing for obtaining the lens status data and making a command based on the drive parameters.

[2-3. Effect]

As described above, camera system 1 according to the present exemplary embodiment can transfer a large amount of lens data at high speed using two communication circuits upon activation. That is, the present disclosure can provide camera system 1 which can reduce a waiting time upon lens data communication, and reduce a camera activation time.

Further, camera system 1 can simultaneously transmit drive parameters and receive lens status data upon image capturing. That is, the present disclosure can provide camera system 1 which can reduce the time required to control driving of the lens.

Further, camera system 1 synchronizes data communication using the first data communication circuit and data communication using the second data communication circuit, with the same synchronization clock signal. That is, camera system 1 matches a period in which data communication is performed using the first data communication circuit and a period in which data communication is performed using the second data communication circuit (S9 and S10 in FIG. 3, and T9 and T10 in FIG. 4). By employing this configuration, camera system 1 does not need a handshake communicator which is independent from the second data communication circuit. Further, camera system 1 does not need to additionally provide a synchronization clock communicator to the second data communication circuit. Consequently, camera system 1 can be realized with a simple configuration.

Further, camera system 1 according to the present exemplary embodiment is the length of data transmitted and received using the first data communication circuit equal to the length of data transmitted using the second data communication circuit. For example, when the length of data to be transmitted using the second data communication circuit does not meet a predetermined length of data, lens controller 240 inserts dummy data into the data to adjust the length of data to the predetermined length of data. Consequently, it is possible to match the length of data. As a result, the length of data exchanged between the first data communication circuit and the second data communication circuit are equal. Consequently, a pair of handshake communicators can define transmission and reception of the two data communication circuits. Further, camera system 1 synchronizes data to be transmitted and received, with the same synchronization clock signal. Consequently, it is not necessary to additionally provide a synchronization clock communicator to the second data communication circuit, either.

Second Exemplary Embodiment

1. Configuration

Figure 5:
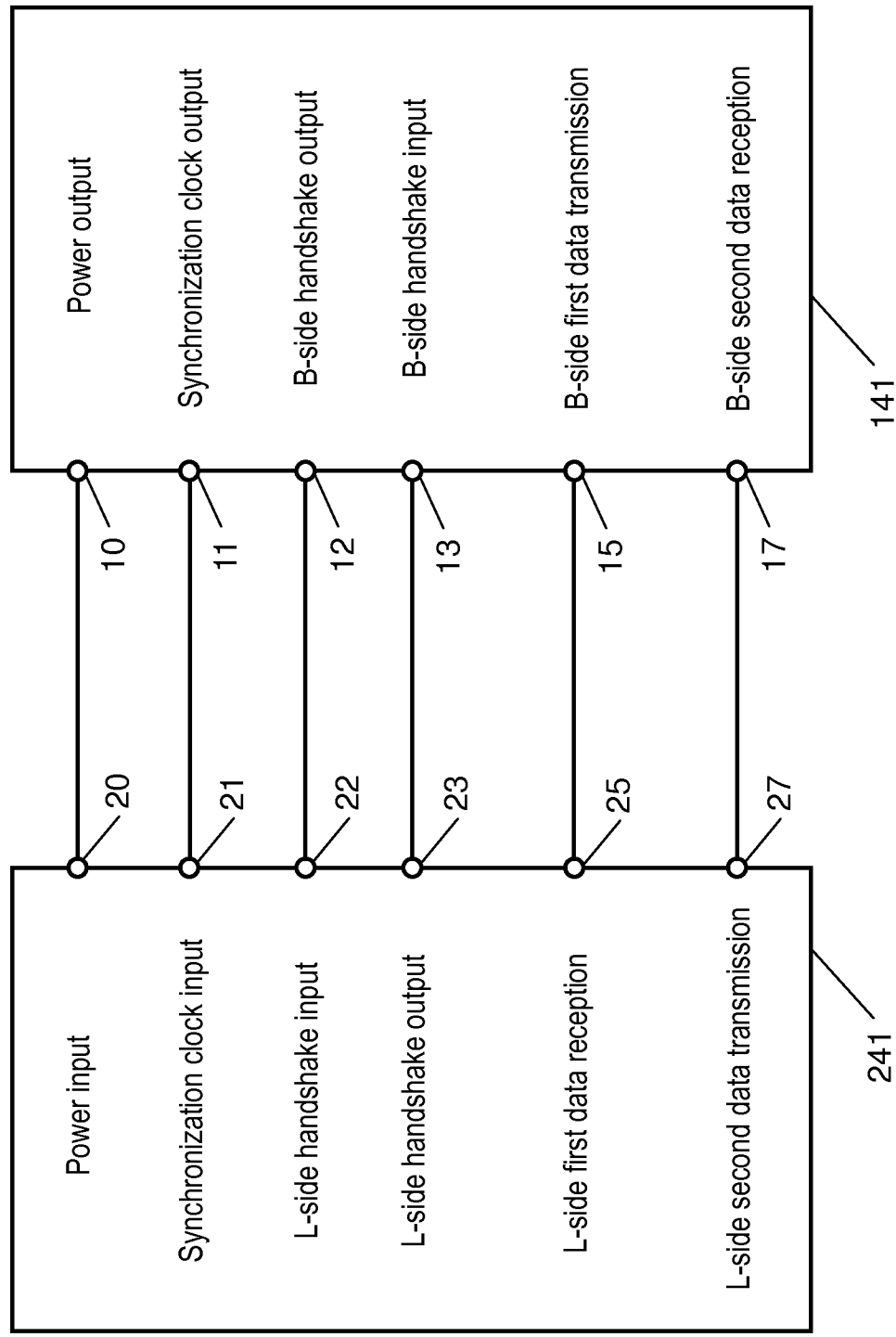
FIG. 5 is a view schematically illustrating each circuit included in a camera controller and a lens controller according to a second exemplary embodiment.

FIG. 5 is a view schematically illustrating each circuit included in camera controller 141 and lens controller 241 according to the second exemplary embodiment.

A camera system according to the second exemplary embodiment includes camera controller 141 illustrated in FIG. 5 instead of camera controller 140 according to the first exemplary embodiment, and includes lens controller 241 illustrated in FIG. 5 instead of lens controller 240.

Camera controller 141 differs from camera controller 140 in including no B-side first data communication circuit 14 and B-side first data reception circuit 16, and the other configuration is the same as that of camera controller 140. Further, lens controller 241 differs from lens controller 240 in including no L-side first data communication circuit 24 and L-side first data transmission circuit 26, and the other configuration is the same as that of lens controller 240. That is, camera controller 141 has B-side first data transmission circuit 15, lens controller 241 has L-side first data reception circuit 25, and B-side first data transmission circuit 15 and L-side first data reception circuit 25 configure a first data communication circuit. In this case, the first data communication circuit is a circuit which transfers data from camera controller 141 to lens controller 241.

2. Operation

Upon activation of the camera system, a lens data obtaining command transmitted from camera controller 141 to lens controller 241 is transmitted by the first data communication circuit. The second data communication circuit causes camera controller 141 to receive lens data from lens controller 241.

Further, in the normal mode (upon image capturing), the first data communication circuit causes camera controller 141 to transmit the lens status obtaining/drive command and the drive parameters to lens controller 241. Furthermore, the second data communication circuit causes lens controller 241 to transmit lens status data from lens controller 241 to camera controller 141.

In addition, operations of the handshake communicator and the synchronization clock communicator according to the second exemplary embodiment are the same as those of the first exemplary embodiment, and therefore will not be described.

3. Effect

The camera system according to the second exemplary embodiment can employ the simplified configuration of the first data communication circuit, and transmit and receive commands, lens data and drive parameters between camera controller 141 and lens controller 241. Further, similar to the effect of the first exemplary embodiment, it is not necessary to provide a handshake communicator and a synchronization clock communicator independently from the second communication circuit. Furthermore, it is possible to realize a camera system with a simple configuration.

Other Exemplary Embodiments

In addition, in the first exemplary embodiment, an imaging device receives lens data in the high speed mode upon activation. However, the present disclosure is not limited to this. The imaging device may receive lens data in the high speed mode when the interchangeable lens is attached.

As described above, the exemplary embodiments have been described as an exemplary technique according to the present disclosure. Therefore, the accompanying drawings and the detailed description have been provided.

Accordingly, the components disclosed in the accompanying drawings and the detailed description of the invention include not only components which are required to solve the problem but also components which are not required to solve the problem in order to describe the above exemplary technique. Therefore, it should not be immediately understood that those components which are not required are necessary simply because these components which are not required are disclosed in the accompanying drawings and the detailed description of the invention.

Further, the above exemplary embodiments are the exemplary technique according to the present disclosure, and consequently can be variously changed, replaced, added and omitted within the scope of the claims or the scope equivalent to the claims.

INDUSTRIAL APPLICABILITY

The present disclosure relates to a camera system to which an interchangeable lens is detachably attached and, more particularly, is applicable to the camera system which performs communication between a camera body and an interchangeable lens. Still more specifically, the present disclosure is applicable to a mirrorless camera or a single-lens reflex camera.

What is claimed is:
1. A communication system comprising:
a first device; and
a second device, wherein
the first device includes a first controller which provides a first data communication circuit and a data transmission circuit, the second device includes a second controller which provides a second data communication circuit and a data reception circuit, the first controller which transmits and receives data using the first data communication circuit through a first communication line, and transmits data using the data transmission circuit through a second communication line, the second controller which transmits and receives data using the second data communication circuit through the first communication line, and receives data using the data reception circuit through the second communication line, and the second controller switches and selectively executes one of:

a reception mode for receiving data from the first controller using the second communication circuit and the data reception circuit through the first communication line and the second communication line, and a transmission/reception mode for transmitting data to the first controller using the second data communication circuit through the first communication line and receiving data from the first controller using the data reception circuit through the second communication line.

2. The communication system according to claim 1, wherein the second controller operates in the reception mode when the second device detects the first device, and switches to the transmission/reception mode when the reception of the data in the reception mode is finished.

3. The communication system according to claim 1, wherein the first controller and the second controller are further connected through a handshake communicator which notifies at least a communication timing, when the first controller receives a command of the reception mode from the second controller, the first controller notifies the communication timing to the second controller using a first handshake signal through the handshake communicator, is notified of the communication timing by a second handshake signal from the second controller, and transmits the data using both of the first data communication circuit and the data transmission circuit through the first communication line and the second communication line, and when the first controller receives a command of the transmission/reception mode from the second controller, the first controller is notified of the communication timing by the second handshake signal from the second controller through the handshake communicator, notifies the communication timing to the second controller using the first handshake signal, and receives the data using the first data communication circuit through the first communication line and transmits the data using the data transmission circuit through the second communication line.

4. The communication system according to claim 3, wherein the first controller and the second controller are further connected through a synchronization clock communicator, and perform data communication in synchronization with a synchronization clock signal through the synchronization clock communicator, in the reception mode, the first controller transmits the data using the first data communication circuit through the first communication line and transmits the data using the data transmission circuit through the second communication line in synchronization with the synchronization clock signal, and in the transmission/reception mode, the first controller receives the data using the first data communication circuit through the first communication line and transmits the data using the data transmission circuit through the second communication line in synchronization with the synchronization clock signal.

5. The communication system according to claim 1, wherein a data length of the data transmitted using the first communication line is equal to a data length of the data transmitted using the second communication line.

6. A camera system comprising:

an interchangeable lens; and a camera body, wherein the interchangeable lens includes a lens controller which provides a first data communication circuit and a data transmission circuit, the camera body includes a body controller which provides a second data communication circuit and a data reception circuit, the lens controller which transmits and receives data using the first data communication circuit through a first communication line, and transmits data using the data transmission circuit through a second communication line, the body controller which transmits and receives data using the second data communication circuit through the first communication line, and receives data using the data reception circuit through the second communication line, and the body controller switches and selectively executes one of:

a reception mode for receiving data from the lens controller using the second communication circuit and the data reception circuit through the first communication line and the second communication line, and a transmission/reception mode for transmitting data to the lens controller using the second data communication circuit through the first communication line and receiving data from the lens controller using the data reception circuit through the second communication line.

7. The camera system according to claim 6, wherein the body controller operates in the reception mode when the camera body detects the interchangeable lens, and switches to the transmission/reception mode when the reception of the data in the reception mode is finished.

8. The camera system according to claim 6, wherein the lens controller and the body controller are further connected through a handshake communicator which notifies at least a communication timing, when the lens controller receives a command of the reception mode from the body controller, the lens controller notifies the communication timing to the body controller using a first handshake signal through the handshake communicator, is notified of the communication timing by a second handshake signal from the body controller, and transmits the data using both of the first data communication circuit and the data transmission circuit through the first communication line and the second communication line, and when the lens controller receives a command of the transmission/reception mode from the body controller, the lens controller is notified of the communication timing by the second handshake signal from the body controller through the handshake communicator, notifies the communication timing to the body controller using the first handshake signal, and receives the data using the first data communication circuit through the first communication line and transmits the data using the data transmission circuit through the second communication line.

9. The camera system according to claim 8, wherein the lens controller and the body controller are further connected through a synchronization clock communicator, and perform data communication in synchronization with a synchronization clock signal through the synchronization clock communicator, in the reception mode, the lens controller transmits the data using the first data communication circuit through the first communication line and transmits the data using the data transmission circuit through the second communication line in synchronization with the synchronization clock signal, and in the transmission/reception mode, the lens controller receives the data using the first data communication circuit through the first communication line and transmits the data using the data transmission circuit through the second communication line in synchronization with the synchronization clock signal.

10. A camera system which comprises a camera body, and an interchangeable lens, the camera system comprising:

a first communication line which connects between a first data communication circuit of the interchangeable lens and a second data communication circuit of the camera body with a direction of the communication switchable;

a second communication line which connects between a data transmission circuit of the interchangeable lens and a data reception circuit of the camera body in a predetermined communication direction; and a controller which controls communication through the first communication line and the second communication line, and the controller includes:

a first communication state of matching the communication direction through the first communication line and the communication direction through the second communication line, and performing unidirectional communication between the interchangeable lens and the camera body using both of the first and the second communication lines, and a second communication state of differing the communication direction through the first communication line and the communication direction through the second communication line, and performing bidirectional communication between the interchangeable lens and the camera body using both of the first and the second communication lines.

* * * * *